(12) United States Patent
Endo et al.

(10) Patent No.: US 9,421,643 B2
(45) Date of Patent: Aug. 23, 2016

(54) LASER PROCESSING APPARATUS

(71) Applicant: DISCO CORPORATION, Tokyo (JP)

(72) Inventors: Tomoaki Endo, Tokyo (JP); Kentaro Odanaka, Tokyo (JP)

(73) Assignee: Disco Corporation, Tokyo (JP)

( * ) Notice: Subject to any disclaimer, the term of this patent is extended or adjusted under 35 U.S.C. 154(b) by 350 days.

(21) Appl. No.: 14/219,718

(22) Filed: Mar. 19, 2014

(65) Prior Publication Data

US 2014/0305918 A1    Oct. 16, 2014

(30) Foreign Application Priority Data

Apr. 10, 2013 (JP) ................................. 2013-082120

(51) Int. Cl.
*B23K 26/16* (2006.01)
*B23K 26/36* (2014.01)
*B23K 26/40* (2014.01)
*B23K 26/00* (2014.01)

(52) U.S. Cl.
CPC ............. *B23K 26/40* (2013.01); *B23K 26/0087* (2013.01); *B23K 26/142* (2015.10); *B23K 26/16* (2013.01); *B23K 26/364* (2015.10); *B23K 26/36* (2013.01); *B23K 2201/40* (2013.01); *B23K 2203/50* (2015.10)

(58) Field of Classification Search
CPC ........ B23K 26/00; B23K 26/16; B23K 26/36; B23K 26/364
USPC ........................................ 219/121.68, 121.69
See application file for complete search history.

(56) References Cited

U.S. PATENT DOCUMENTS 5,103,074 A * 4/1992 Watanabe .......... B23K 26/0736
219/121.68

FOREIGN PATENT DOCUMENTS

JP    2007-069249    3/2007

* cited by examiner

*Primary Examiner* — Samuel M Heinrich
(74) *Attorney, Agent, or Firm* — Greer Burns & Crain, Ltd.

(57) ABSTRACT

A laser processing apparatus including a dust discharging unit for discharging dust generated by the application of a laser beam from a focusing unit to a workpiece. The dust discharging unit includes a dust collector provided below the focusing unit and a suction unit connected to the dust collector. The dust collector has a U-shaped configuration composed of a rectangular top wall having an opening for allowing the pass of the laser beam applied from the focusing unit, a first side wall projecting downward from one side edge of the top wall, and a second side wall projecting downward from the other side edge of the top wall so as to be opposed to the first side wall. The suction unit includes a suction duct having one end connected to the dust collector and the other end connected to a vacuum source.

2 Claims, 6 Drawing Sheets

LASER PROCESSING APPARATUS

BACKGROUND OF THE INVENTION

1. Field of the Invention

The present invention relates to a laser processing apparatus for performing laser processing to a workpiece such as a semiconductor wafer.

2. Description of the Related Art

In a semiconductor device fabrication process, a plurality of crossing division lines called streets are formed on the front side of a substantially disk-shaped semiconductor wafer to thereby partition a plurality of regions where a plurality of devices such as ICs and LSIs are respectively formed. The semiconductor wafer is cut along the streets to thereby divide the regions where the devices are formed from each other, thus obtaining a plurality of individual semiconductor chips. Further, an optical device wafer is provided by forming a plurality of optical devices including light receiving devices such as photodiodes and light emitting devices such as laser diodes on the front side of a sapphire substrate. The optical device wafer is also cut along the streets to obtain the individual optical devices divided from each other, such as photodiodes and laser diodes, which are widely used in electric equipment.

As a method of dividing a wafer such as a semiconductor wafer and an optical device wafer along the streets, there has been proposed a method of applying a pulsed laser beam along the streets to thereby form laser processed grooves along the streets on the wafer and next breaking the wafer along these laser processed grooves.

However, when a laser beam is applied to a wafer of silicon, sapphire, etc. as a workpiece along the streets, the wafer is melted to cause scattering of melt dust, or debris, so that there arises a problem such that the dust scattered may stick to the front side of the devices formed in the rectangular regions of the wafer, causing a degradation in quality of each device. Further, there is another problem such that the dust such as debris scattered may stick to a focusing lens included in focusing means for applying a laser beam, causing the interference with the application of the laser beam.

To solve this problem, there has been proposed a laser processing apparatus including dust discharging means for collecting and discharging dust such as debris generated by the application of a laser beam to a workpiece from focusing means constituting laser beam applying means (see Japanese Patent Laid-open No. 2007-69249, for example).

SUMMARY OF THE INVENTION

In the laser processing apparatus disclosed in Japanese Patent Laid-open No. 2007-69249, the dust such as debris generated by the application of the laser beam from the focusing means to the workpiece is sucked by the dust discharging means. At this time, the dust may rise spirally along the optical path of the laser beam applied from the focusing means, so that there is a problem such that the optical path of the laser beam applied from the focusing means may be hindered by the dust, causing defective processing.

It is therefore an object of the present invention to provide a laser processing apparatus which can discharge the dust such as debris generated by the application of a laser beam from focusing means to a workpiece, without the hindrance to the optical path of the laser beam applied from the focusing means.

In accordance with an aspect of the present invention, there is provided a laser processing apparatus including: a chuck table for holding a workpiece; laser beam applying means having focusing means for applying a laser beam to the workpiece held on the chuck table to thereby process the workpiece; and dust discharging means for discharging dust generated by the application of the laser beam from the focusing means to the workpiece. The dust discharging means includes a dust collector provided below the focusing means and suction means connected to the dust collector. The dust collector has a U-shaped configuration composed of a rectangular top wall having an opening for allowing the pass of the laser beam applied from the focusing means, a first side wall projecting downward from one side edge of the top wall, and a second side wall projecting downward from the other side edge of the top wall so as to be opposed to the first side wall, whereby a first rectangular opening is formed by one end of the top wall, one end of the first side wall, and one end of the second side wall, and a second rectangular opening is formed by the other end of the top wall, the other end of the first side wall, and the other end of the second side wall. The suction means includes a suction duct having one end connected to the first rectangular opening of the dust collector and the other end connected to a vacuum source.

Preferably, the second rectangular opening of the dust collector is connected to air supplying means.

As described above, the laser processing apparatus according to the present invention includes the dust discharging means for discharging the dust generated by the application of the laser beam from the focusing means to the workpiece. The dust discharging means includes the dust collector provided below the focusing means and the suction means connected to the dust collector. The dust collector has the U-shaped configuration composed of the rectangular top wall having the opening for allowing the pass of the laser beam applied from the focusing means, the first side wall projecting downward from one side edge of the top wall, and the second side wall projecting downward from the other side edge of the top wall so as to be opposed to the first side wall, whereby the first rectangular opening is formed at one end of the dust collector and the second rectangular opening is formed at the other end of the dust collector. The suction means includes the suction duct having one end connected to the first rectangular opening of the dust collector and the other end connected to the vacuum source. Accordingly, the air in the dust collector is sucked toward the suction duct.

With this configuration, the dust generated by the application of the laser beam to the workpiece is discharged toward the suction duct with the air flowing toward the suction duct. In this manner, the dust generated by the application of the laser beam does not rise spirally, but it is discharged toward the suction duct with the air flow produced in the dust collector. Accordingly, the optical path of the laser beam applied from the focusing means is not hindered by the dust, thereby solving the problem that the dust may cause defective processing.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
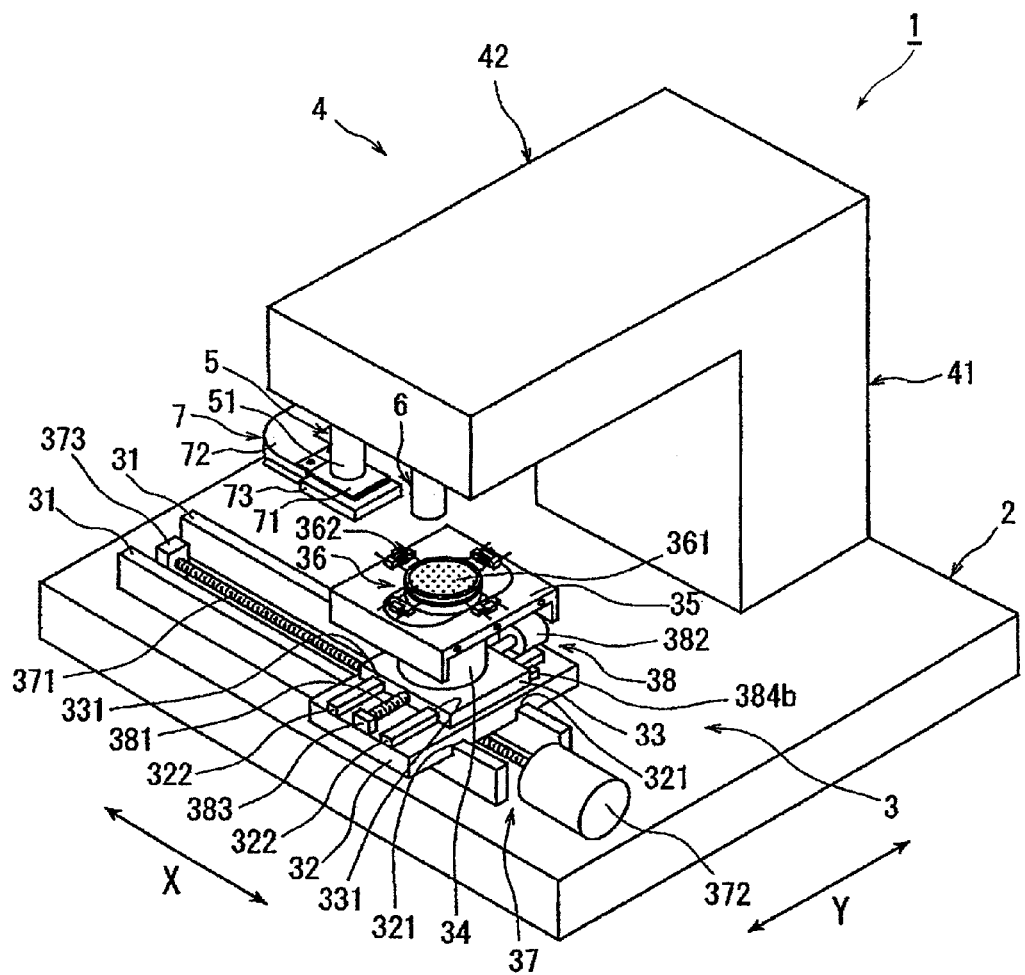
FIG. 1 is a perspective view of a laser processing apparatus according to a preferred embodiment of the present invention.

A preferred embodiment of the laser processing apparatus according to the present invention will now be described in detail with reference to the attached drawings. FIG. 1 is a perspective view of a laser processing apparatus 1 according to a preferred embodiment of the present invention. The laser processing apparatus 1 shown in FIG. 1 includes a stationary base 2, a chuck table mechanism 3 for holding a workpiece, the chuck table mechanism 3 being provided on the stationary base 2 so as to be movable in a feeding direction (X direction) shown by an arrow X, and a laser beam applying unit 4 as laser beam applying means provided on the stationary base 2.

The chuck table mechanism 3 includes a pair of guide rails 31 provided on the stationary base 2 so as to extend parallel to each other in the X direction, a first slide block 32 provided on the guide rails 31 so as to be movable in the X direction, a second slide block 33 provided on the first slide block 32 so as to be movable in an indexing direction (Y direction) shown by an arrow Y perpendicular to the X direction, a cover table 35 supported by a cylindrical member 34 standing on the second slide block 33, and a chuck table 36 as workpiece holding means. The chuck table 36 has a vacuum chuck 361 formed of a porous material. A workpiece such as a disk-shaped semiconductor wafer is adapted to be held under suction on the upper surface of the vacuum chuck 361 as a workpiece holding surface by operating suction means (not shown). The chuck table 36 is rotatable by a pulse motor (not shown) provided in the cylindrical member 34. Further, the chuck table 36 is provided with clamps 362 for fixing an annular frame supporting a workpiece such as a semiconductor wafer through a protective tape.

The lower surface of the first slide block 32 is formed with a pair of guided grooves 321 for slidably engaging the pair of guide rails 31 mentioned above. A pair of guide rails 322 are provided on the upper surface of the first slide block 32 so as to extend parallel to each other in the Y direction. Accordingly, the first slide block 32 is movable in the X direction along the guide rails 31 by the slidable engagement of the guided grooves 321 with the guide rails 31. The chuck table mechanism 3 further includes feeding means 37 for moving the first slide block 32 in the X direction along the guide rails 31. The feeding means 37 includes an externally threaded rod 371 extending parallel to the guide rails 31 so as to be interposed therebetween and a pulse motor 372 as a drive source for rotationally driving the externally threaded rod 371. The externally threaded rod 371 is rotatably supported at one end thereof to a bearing block 373 fixed to the stationary base 2 and is connected at the other end to the output shaft of the pulse motor 372 so as to receive the torque thereof. The externally threaded rod 371 is engaged with a tapped through hole formed in an internally threaded block (not shown) projecting from the lower surface of the first slide block 32 at a central portion thereof. Accordingly, the first slide block 32 is moved in the X direction along the guide rails 31 by operating the pulse motor 372 to normally or reversely rotate the externally threaded rod 371.

The lower surface of the second slide block 33 is formed with a pair of guided grooves 331 for slidably engaging the pair of guide rails 322 provided on the upper surface of the first slide block 32 as mentioned above. Accordingly, the second slide block 33 is movable in the Y direction along the guide rails 322 by the slidable engagement of the guided grooves 331 with the guide rails 322. The chuck table mechanism 3 further includes indexing means 38 for moving the second slide block 33 in the Y direction along the guide rails 322. The indexing means 38 includes an externally threaded rod 381 extending parallel to the guide rails 322 so as to be interposed therebetween and a pulse motor 382 as a drive source for rotationally driving the externally threaded rod 381. The externally threaded rod 381 is rotatably supported at one end thereof to a bearing block 383 fixed to the upper surface of the first slide block 32 and is connected at the other end to the output shaft of the pulse motor 382 so as to receive the torque thereof. The externally threaded rod 381 is engaged with a tapped through hole formed in an internally threaded block (not shown) projecting from the lower surface of the second slide block 33 at a central portion thereof. Accordingly, the second slide block 33 is moved in the Y direction along the guide rails 322 by operating the pulse motor 382 to normally or reversely rotate the externally threaded rod 381.

The laser beam applying unit 4 includes a supporting member 41 provided on the stationary base 2, a casing 42 supported to the supporting member 41 so as to extend in a substantially horizontal direction, laser beam applying means 5 provided in connection with the casing 42, and imaging means 6 provided at the front end portion of the casing 42 for detecting a subject area of the workpiece to be laser-processed by the laser beam applying means 5. The laser beam applying means 5 includes laser beam oscillating means (not shown) such as a YAG laser or a YVO4 laser provided in the casing 42, and focusing means 51 provided at the front end portion of the casing 42 adjacent to the imaging means 6 for focusing a pulsed laser beam oscillated by the laser beam oscillating means and applying this pulsed laser beam to the workpiece held on the chuck table 36. The imaging means 6 essentially includes an imaging device (CCD). An image signal output from the imaging means 6 is transmitted to control means (not shown).

The laser processing apparatus 1 further includes dust discharging means 7 for discharging dust generated by the application of a laser beam from the focusing means 51 to the workpiece held on the chuck table 36. This dust discharging means 7 will now be described with reference to FIGS. 2 to 4.

Figure 3:
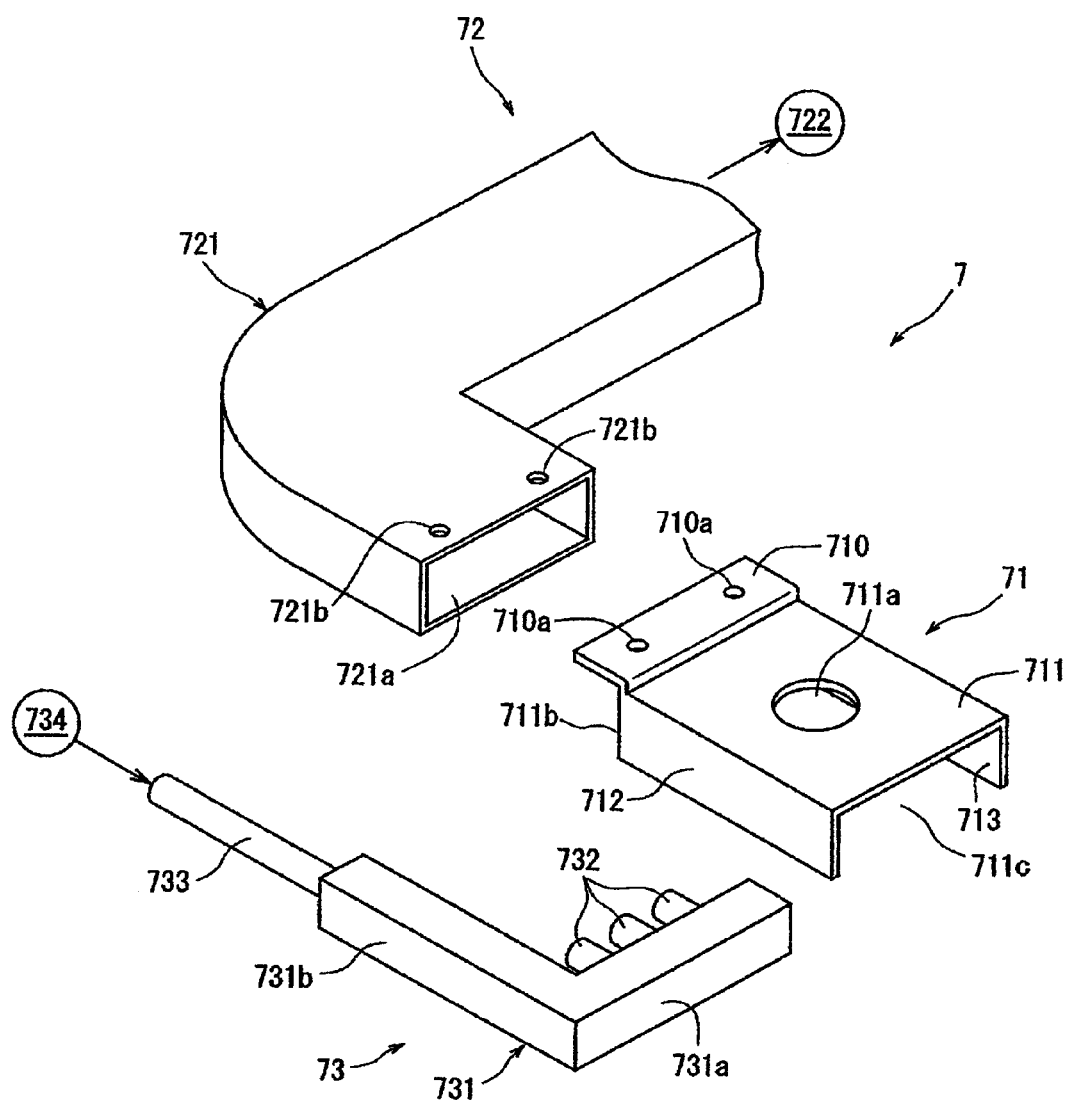
FIG. 3 is an exploded perspective view of the dust discharging means shown in FIG. 2.
Figure 4:
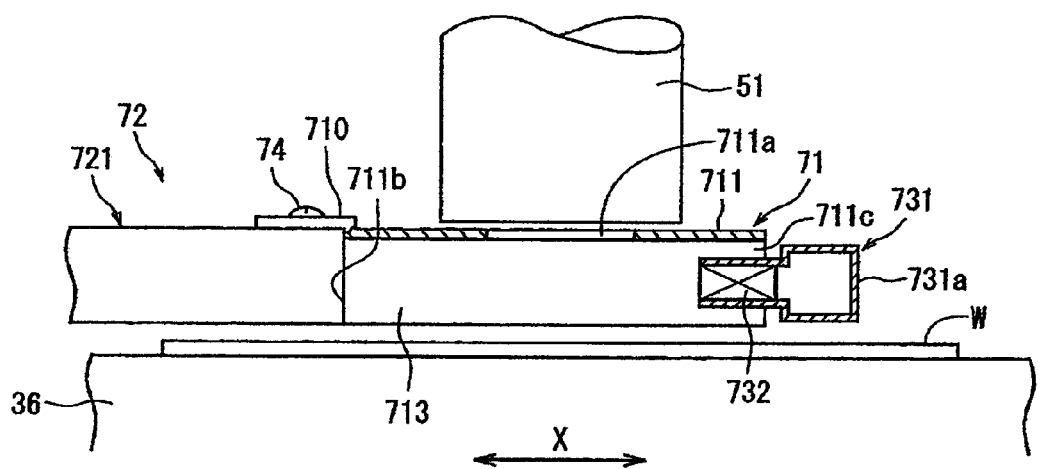
FIG. 4 is a sectional view of the dust discharging means shown in FIG. 2.

The dust discharging means 7 includes a dust collector 71 provided below the focusing means 51, suction means 72 connected to the dust collector 71, and air supplying means 73 for supplying air to the dust collector 71. The dust collector 71 has a U-shaped configuration composed of a rectangular top wall 711 having an opening 711a for allowing the pass of a laser beam applied from the focusing means 51, a first side wall 712 projecting downward from one side edge of the top wall 711, and a second side wall 713 projecting downward from the other side edge of the top wall 711 so as to be opposed to the first side wall 712. As shown in FIGS. 3 and 4, a rectangular opening 711b is formed by one end of the top wall 711, one end of the first side wall 712, and one end of the second side wall 713. Similarly, a rectangular opening 711c is formed by the other end of the top wall 711, the other end of the first side wall 712, and the other end of the second side wall 713. That is, the dust collector 71 has the rectangular openings 711b and 711c at the opposite ends and is open on the lower side. A connecting portion 710 projects from one end of the top wall 711 constituting the dust collector 71 in parallel relationship with the top wall 711 in the condition where the connecting portion 710 is raised from the top wall 711 by the thickness thereof. The connecting portion 710 is formed with two bolt insertion holes 710a. The first side wall 712 and the second side wall 713 constituting the dust collector 71 are elongated in the X direction.

Figure 2:
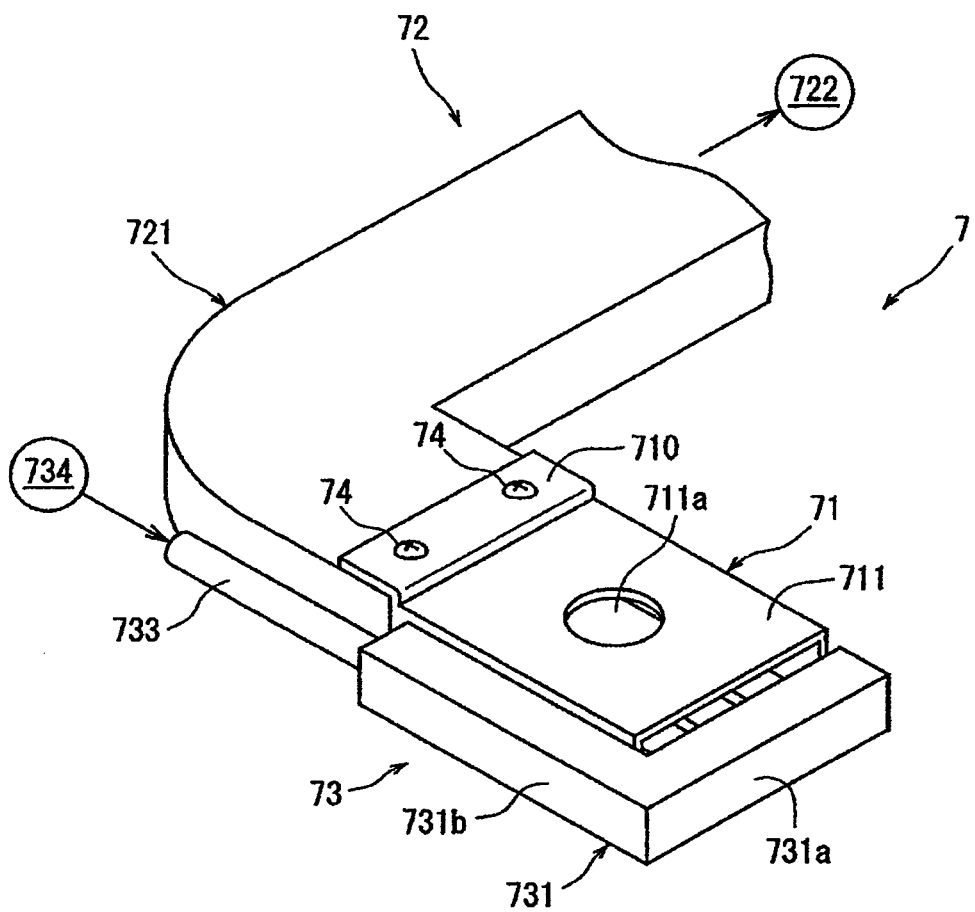
FIG. 2 is a perspective view of an essential part of dust discharging means included in the laser processing apparatus shown in FIG. 1.

The suction means 72 constituting the dust discharging means 7 includes a suction duct 721 having one end connected to one of the rectangular openings 711b and 711c (specifically, the rectangular opening 711b as shown in FIGS. 3 and 4) of the dust collector 71. The suction duct 721 has a passage 721a rectangular in cross section as shown in FIG. 3. Two tapped holes 721b are formed through the top wall of the suction duct 721 at one end portion thereof. These two tapped holes 721b are formed so as to respectively correspond to the two bolt insertion holes 710a of the connecting portion 710 constituting the dust collector 71. The dust collector 71 is fixedly connected to one end of the suction duct 721 in the following manner. First, one end of the suction duct 721 is joined to the rectangular opening 711b of the dust collector 71. In this condition, the two bolt insertion holes 710a of the connecting portion 710 constituting the dust collector 71 are respectively aligned with the two tapped holes 721b of the suction duct 721. As shown in FIG. 2, two fastening bolts 74 are inserted through the two bolt insertion holes 710a of the dust collector 71 and then threadedly engaged with the two tapped holes 721b of the suction duct 721. As shown in FIG. 4, the lower ends of the first and second side walls 712 and 713 constituting the dust collector 71 (only the second side wall 713 being shown in FIG. 4) are spaced a predetermined distance from the upper surface of the workpiece W held on the chuck table 36. In this preferred embodiment, this predetermined distance is set to 0.5 to 1.0 mm, for example. As shown in FIGS. 2 and 3, the other end of the suction duct 721 is connected to a vacuum source 722.

The air supplying means 73 constituting the dust discharging means 7 is composed of an air supply duct 731 having a rectangular cross section, three air diffusion filters 732 mounted on one side surface of the air supply duct 731, and a communication duct 733 for connecting the air supply duct 731 to an air source 734. The air supply duct 731 has an L-shaped configuration composed of a filter mounting portion 731a and a mounted portion 731b. One end of the filter mounting portion 731a is closed and the other end of the filter mounting portion 731a is connected to one end of the mounted portion 731b. The three air diffusion filters 732 are mounted on one side surface of the filter mounting portion 731a constituting the air supply duct 731. The three air diffusion filters 732 mounted on the filter mounting portion 731a of the air supply duct 731 are inserted into the rectangular opening 711c of the dust collector 71. In this condition, one side surface of the mounted portion 731b is mounted to the first side wall 712 of the dust collector 71. The other end of the mounted portion 731b mounted to the first side wall 712 is connected to the communication duct 733.

The dust discharging means 7 as configured above is operated in the following manner. The air in the dust collector 71 is sucked through the suction duct 721 connected to the vacuum source 722 at a suction rate of 1 m$^3$/min. On the other hand, air is supplied from the air source 734 through the communication duct 733, the air supply duct 731, and the three air diffusion filters 732 into the dust collector 71 at a supply rate of 0.7 m$^3$/min.

Figure 5A:
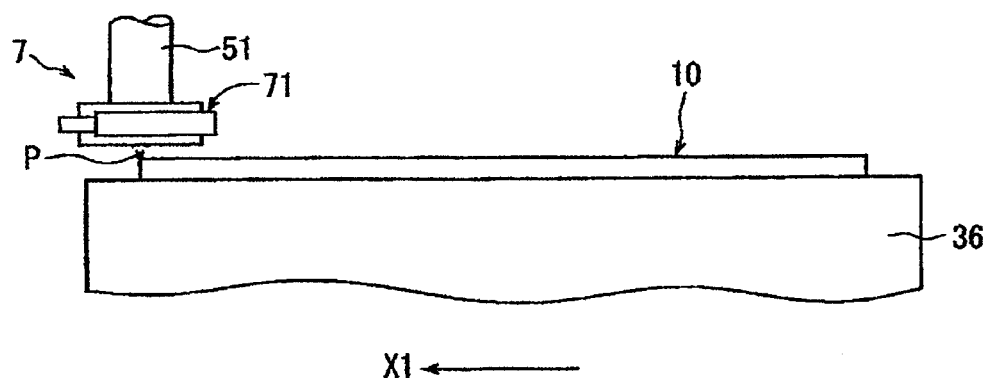
FIGS. 5A and 5B are schematic side views for illustrating a laser processed groove forming step to be performed by the laser processing apparatus shown in FIG. 1.

The operation of the laser processing apparatus 1 configured above will now be described. As shown in FIG. 5A, a semiconductor wafer 10 as a workpiece is placed on the chuck table 36 of the laser processing apparatus 1 and the suction means (not shown) connected to the chuck table 36 is operated to hold the semiconductor wafer 10 on the chuck table 36 under suction. Although not shown, a plurality of crossing streets are formed on the front side of the semiconductor wafer 10 to thereby partition a plurality of regions where a plurality of devices such as ICs and LSIs are respectively formed. The chuck table 36 holding the semiconductor wafer 10 under suction is moved to a position directly below the imaging means 6 by the feeding means 37. When the chuck table 36 is positioned directly below the imaging means 6, an alignment operation is performed by the imaging means 6 and the control means (not shown) to detect a subject area of the semiconductor wafer 10 to be laser-processed. More specifically, the imaging means 6 and the control means (not shown) perform image processing such as pattern matching for making the alignment of the streets extending in a first direction on the semiconductor wafer 10 and the focusing means 51 of the laser beam applying means 5 for applying the laser beam along these streets, thereby performing the alignment of a laser beam applying position. This alignment operation is performed similarly for the other streets extending in a second direction perpendicular to the first direction.

Figure 5B:
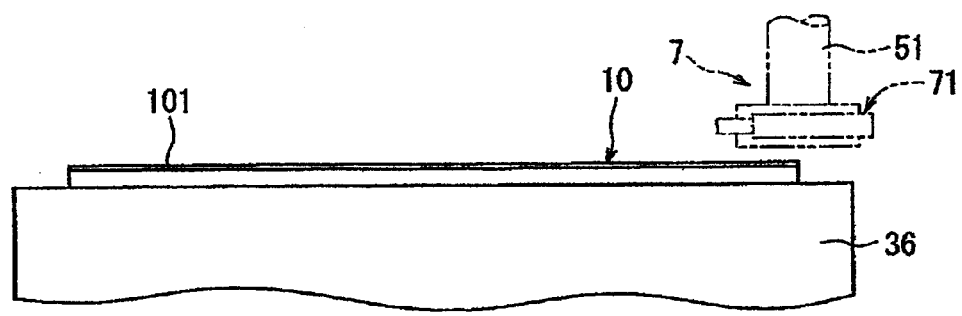

After performing the alignment operation for all of the streets formed on the semiconductor wafer 10 held on the chuck table 36, the chuck table 36 is moved to a laser beam applying area where the focusing means 51 of the laser beam applying means 5 is located as shown in FIG. 5A. Further, one end (left end as viewed in FIG. 5A) of a predetermined one of the streets is positioned directly below the focusing means 51. Thereafter, the focal point P of the pulsed laser beam to be applied from the focusing means 51 is set near the front side (upper surface) of the semiconductor wafer 10. Thereafter, the pulsed laser beam having an absorption wavelength to the semiconductor wafer 10 is applied from the focusing means 51 of the laser beam applying means 5, and the chuck table 36 is moved in the direction shown by an arrow X1 in FIG. 5A at a predetermined feed speed. When the other end (right end as viewed in FIG. 5B) of the predetermined street reaches the position directly below the focusing means 51 as shown in FIG. 5B, the application of the pulsed laser beam is stopped and the movement of the chuck table 36 is also stopped. As a result, a laser processed groove 101 is formed along the predetermined street on the semiconductor wafer 10 as shown in FIG. 5B (laser processed groove forming step).

For example, the laser processed groove forming step mentioned above is performed under the following processing conditions.

Figure 6:
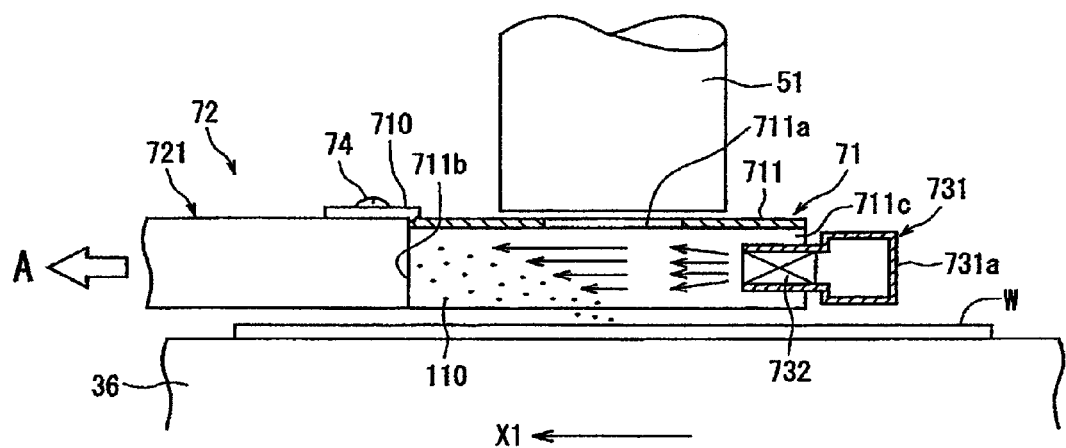
FIG. 6 is a sectional view of the dust discharging means in the condition where the laser processed groove forming step shown in FIGS. 5A and 5B is being performed.

Light source of the laser beam: YVO4 pulsed laser or YAG pulsed laser
    Wavelength: 355 nm
    Repetition frequency: 50 kHz
    Average power: 4 W
    Focused spot diameter: 20 pm
    Work feed speed: 150 mm/s In the laser processed groove forming step mentioned above, the pulsed laser beam is applied from the focusing means 51 to the front side of the semiconductor wafer 10, so that the semiconductor wafer 10 is melted to generate dust such as debris. However, the laser processing apparatus 1 includes the dust discharging means 7 for discharging the dust generated from the semiconductor wafer 10. That is, as shown in FIG. 6, the air in the dust collector 71 is sucked toward the suction duct 721 as shown by an arrow A at a suction rate of 1 m$^3$/min. At the same time, air is supplied through the air supply duct 731 and the three air diffusion filters 732 into the dust collector 71 at a supply rate of 0.7 m$^3$/min. Accordingly, dust 110 generated by the application of the pulsed laser beam to the semiconductor wafer 10 is discharged toward the suction duct 721 with the air flow shown by the arrow A. In this manner, the dust 110 generated by the application of the pulsed laser beam does not rise spirally, but it is discharged toward the suction duct 721 with the air flow shown by the arrow A. Accordingly, the optical path of the pulsed laser beam applied from the focusing means 51 is not hindered by the dust 110, thereby solving the problem that the dust 110 may cause defective processing.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser processing apparatus comprising:
    a chuck table for holding a workpiece;
    laser beam applying means having focusing means for applying a laser beam to the workpiece held on the chuck table to thereby process the workpiece; and
    dust discharging means for discharging dust generated by the application of the laser beam from the focusing means to the workpiece;
    said dust discharging means including a dust collector provided below the focusing means and suction means connected to the dust collector;
    the dust collector having a U-shaped configuration composed of a rectangular top wall having an opening for allowing the pass of the laser beam applied from the focusing means, a first side wall projecting downward from one side edge of the top wall, and a second side wall projecting downward from the other side edge of the top wall so as to be opposed to the first side wall, whereby a first rectangular opening is formed by one end of the top wall, one end of the first side wall, and one end of the second side wall, and a second rectangular opening is formed by the other end of the top wall, the other end of the first side wall, and the other end of the second side wall;
    the suction means including a suction duct having one end connected to the first rectangular opening of the dust collector and the other end connected to a vacuum source.

2. The laser processing apparatus according to claim 1, wherein the second rectangular opening of the dust collector is connected to air supplying means.

* * * * *